Jan. 23, 1934.　　　　　S. B. WINN　　　　　1,944,773
SEMITRAILER
Filed July 27, 1932　　2 Sheets-Sheet 1
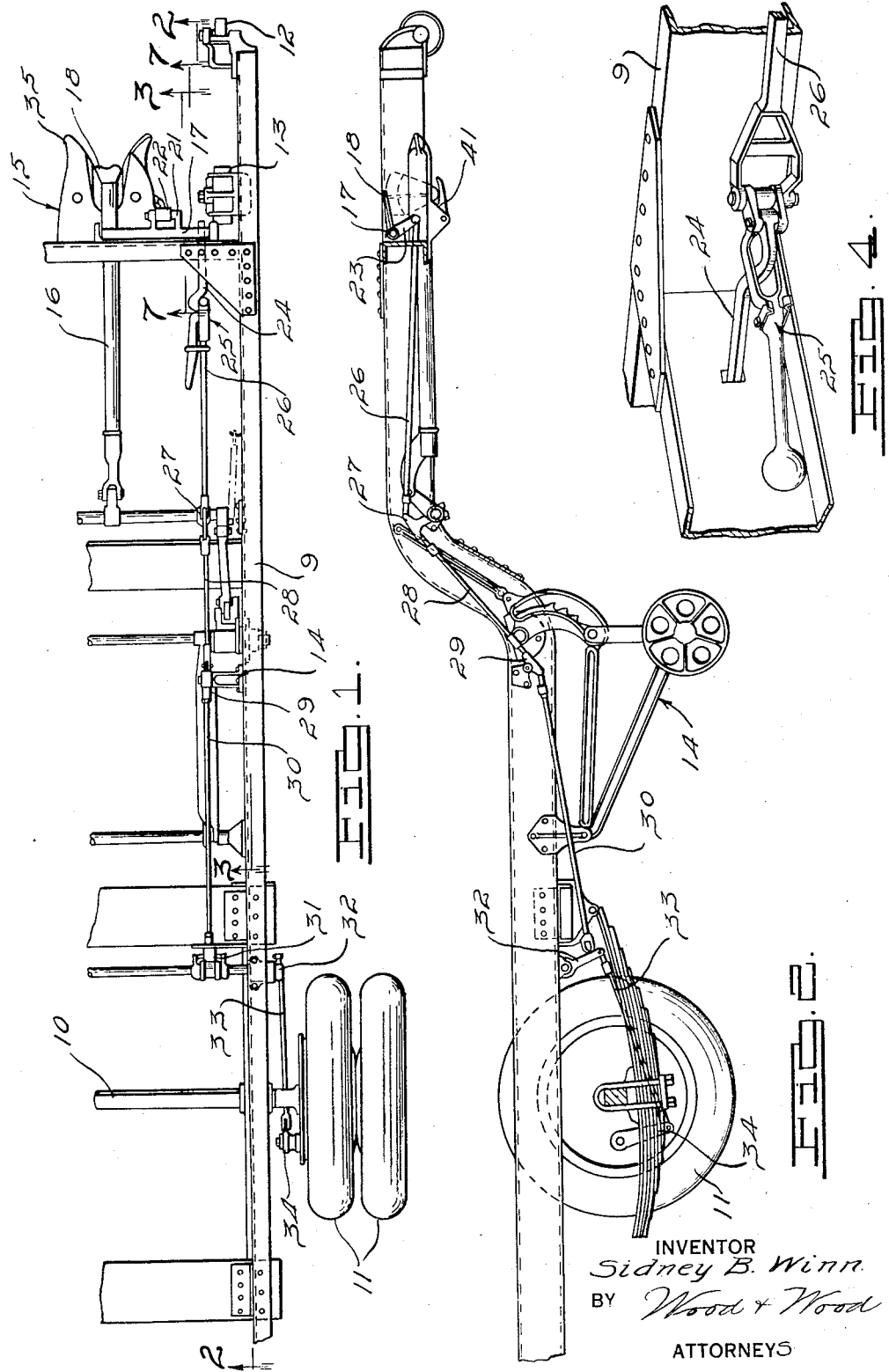
INVENTOR
Sidney B. Winn
BY Wood & Wood
ATTORNEYS Jan. 23, 1934.  S. B. WINN  1,944,773
SEMITRAILER
Filed July 27, 1932   2 Sheets-Sheet 2
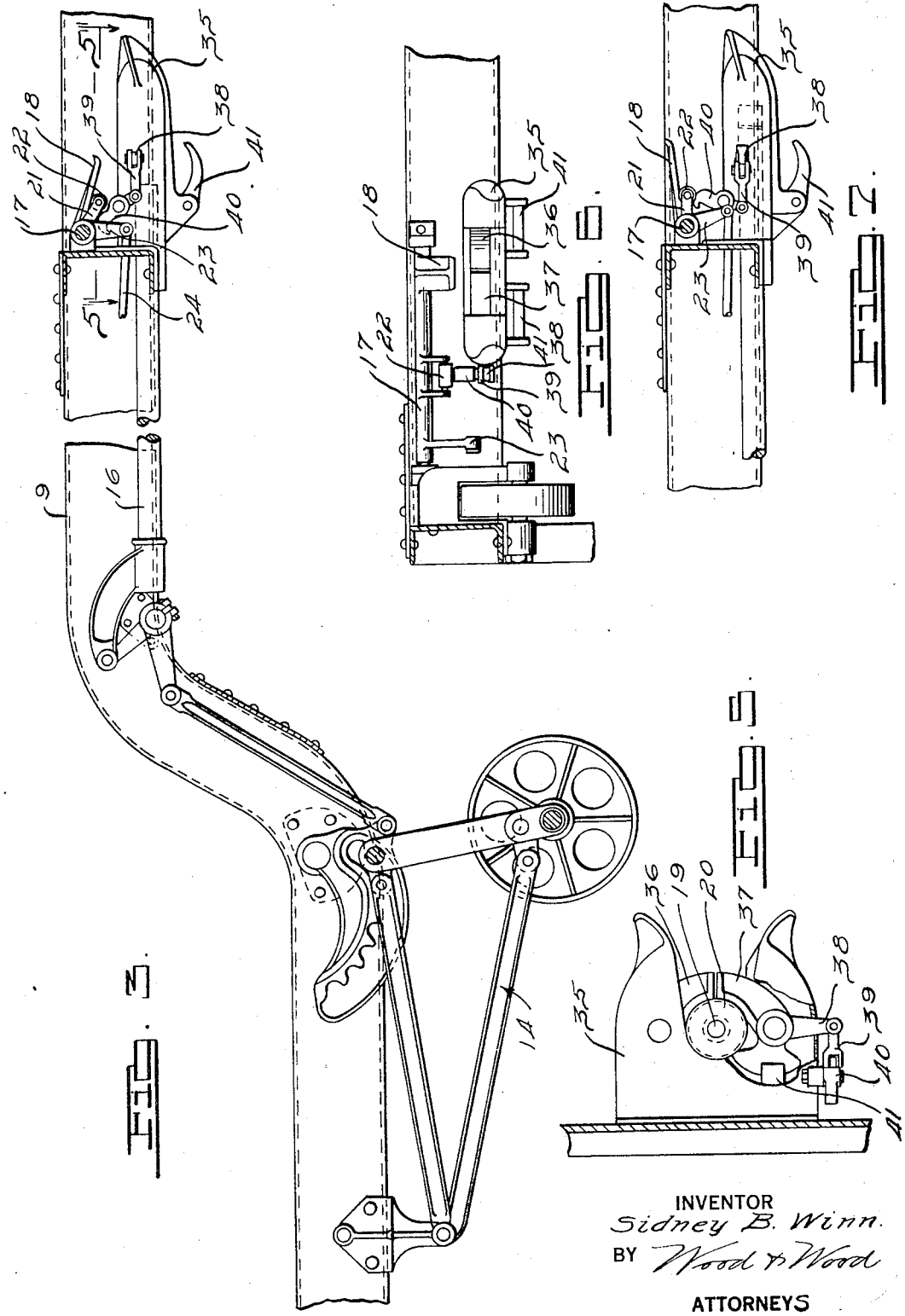
INVENTOR
Sidney B. Winn.
BY Wood & Wood
ATTORNEYS Patented Jan. 23, 1934

1,944,773

UNITED STATES PATENT OFFICE 1,944,773

SEMITRAILER

Sidney B. Winn, Lapeer, Mich.

Application July 27, 1932. Serial No. 625,012

9 Claims. (Cl. 280—33.1)

My invention relates to a semi-trailer of the type shown and described in my co-pending application for United States Letters Patent, Serial No. 625,011, filed July 27, 1932, and more particularly to means for positively locking the brakes on such a trailer when the tractor and trailer are uncoupled. Trailers of the general type disclosed in this application, and in my said co-pending application, are particularly adapted for special types of commercial bodies such as oil tank trailers and the like and it is essential that the trailer brake operating mechanism shall not extend beyond the width of the trailer frame.

In a conventional type of brake operating mechanism a brake operating finger is attached to the trailer and is raised and lowered by means carried on the tractor. In using this type of trailer brake operating means it is necessary to provide sufficient space above the trailer frame to permit a raising of the brake operating finger without contacting with the body portion of the trailer secured to the frame. I have found that in the work for which this type of trailer is particularly adapted that there is not space enough between the body and the frame so as to permit the brake operating finger to be raised freely and held in a sufficiently raised position to lock the brakes on the trailer.

In the construction of trailer vehicles of this type it is essential that provision be made for holding the trailer brakes in the applied position when the tractor and trailer are uncoupled. It is further essential that such holding of the trailer brakes in the applied position should be accomplished automatically when the vehicles are uncoupled.

It is, therefore, an object of the present invention to provide a brake operating mechanism for semi-trailers in which the trailer brake operating mechanism is confined in its movement to the width of the trailer frame, and in which the brakes on the trailer are positively locked when the trailer is uncoupled from the tractor.

It is a further object of my invention to provide a means for automatically holding the trailer brakes in an applied position when the tractor and trailer vehicles are uncoupled.

These, and various other objects, features of arrangement, construction and operation, are plainly shown and described and will be best understood by reference to the accompanying drawings wherein I have shown a preferred embodiment of my invention, in which Fig. 1 is a fragmentary top plan view of a semi-trailer chassis embodying my invention;

Fig. 2 is a fragmentary view in side elevation of a semi-trailer chassis taken on the line 2—2 of Fig. 1;

Fig. 3 is a fragmentary side elevation taken on the line 3—3 of Fig. 1;

Fig. 4 is a perspective detail view of the brake release mechanism shown in Fig. 1;

Fig. 5 is a top plan view with a part broken away showing the coupler head shown in Fig. 1;

Fig. 6 is a fragmentary front elevation of the trailer vehicle shown in Fig. 1;

Fig. 7 is a fragmentary side elevation taken on the line 7—7 of Fig. 1.

Similar reference numerals are used to refer to similar parts throughout the several views.

Referring more in detail to the drawings, the trailer vehicle has a frame 9 on which is mounted an axle 10 having wheels 11. At the forward end of the frame 9 are front elevating wheels 12 and table wheels 13. Adjacent and below the forward end of the frame 9 is a support 14 which holds the forward end of the trailer when it is uncoupled from the tractor, this forward support being the same in construction and mode of operation as the support shown in my co-pending application for United States Letters Patent Serial No. 625,011, filed July 27, 1932. Mounted to the forward cross bar of the trailer frame 9 is the coupler 15, through which runs the bar 16 for elevating the trailer support 14. Secured to the front cross frame and directly above the coupler 15 is a pivoted brake operating rod 17 having a brake operating finger 18 formed thereon. The brake operating finger 18 is directly above the coupler head 15 and is actuated by means of a brake operating pin 19 passing through the king pin 20 on the tractor (Fig. 5). Also attached to the pivoted brake operating rod 17 is a bracket 21 in which is mounted a roller 22. An arm 23 is attached to the brake operating rod 17 and is operatively connected with a trailer brake operating rod 24. The trailer brake operating rod 24 is operatively connected with the brake release lever 25, which in turn is connected to the brake rod 26, which is connected with the bell crank 27, which in turn is connected with a brake rod 28 and another bell crank 29, to which is attached a brake rod 30 secured to the brake equalizing arm 31. Operatively connected to the brake equalizing arm 31 is the brake operating arm 32, which is connected through the brake rod 33 to the brake arm 34.

As shown in Fig. 5, the coupler 15 which is mounted at the forward end of the trailer frame 9 comprises an outer shell 35, within which are pivotally mounted coupler jaws 36 and 37. The jaw 37 is formed with a projecting arm 38, which extends through the shell 35 and is operatively connected with the lever 39. A brake locking member 40 is pivotally mounted on the coupler shell 35 and is directly beneath and adjacent the roller 22 carried by the bracket 21 on the pivoted brake operating rod 17. Pivoted members 41 are provided for locking the coupler jaws 36 and 37 in engagement with the king pin 20 when the tractor-trailer vehicles are coupled.

The operation of my invention is as follows: When the tractor and trailer are to be uncoupled the brakes on the trailer are applied by operation of the brake operating mechanism carried by the tractor (not shown), which is transmitted through the brake operating pin 19 and causes a raising of the trailer brake operating finger 18, which motion is transmitted through the train of levers to the trailer brakes and effects the setting of the brakes on the trailer. When the uncoupling mechanism on the tractor is operated (not shown) it acts to move the pivoted locking members 41 so as to release the coupler jaws 36 and 37 in the coupler 15, which permits the tractor to be driven away from the trailer. This driving of the tractor away from the trailer causes the coupler jaws 36 and 37 to pivot about their pivot points in the shell 35 of the coupler 15 and open the coupler so that the king pin 20 carried by the tractor may be disengaged from the coupler 15 carried by the trailer. The pivoting of the coupler jaw 37 causes a movement of the arm 38, which is transmitted through the arm 39 to the locking member 40, causing the locking member 40 to pivot about its point of pivotal connection and assume the position shown in Fig. 7 beneath the roller 22 mounted in the bracket 21 of the pivoted brake operating rod 17. When this position is assumed by the member 40, the brakes on the trailer are held in their applied position.

During the coupling of the tractor and trailer the king pin 20 carried by the tractor is backed into the coupler 15 carried by the trailer and contacts with heels on the pivoted coupler jaws 36 and 37, causing the pivoted coupler jaws 36 and 37 to pivot about their pivot points and completely enclose the king pin 20, as shown in Fig. 5. When the king pin 20 is in the position shown in Fig. 5 and the coupler jaws 36 and 37 have assumed the position there shown, the pivoted coupler locking members 41, actuated by springs, fall into place in slots in the pivoted coupler jaws 36 and 37 and prevent a release of the tractor king pin 20 except upon manipulation of the uncoupling mechanism on the tractor (not shown). When the coupler jaw 37 has assumed the position shown in Fig. 5, a movement of the arm 38 takes place, which is transmitted through the lever 39 and causes a rotation of the member 40 about its pivot point so that it assumes the position shown in Fig. 3. This permits the pivoted brake operating rod 17 to assume its released position shown in Fig. 3. When in this position the brake operating finger 18 is in the position directly above and adjacent the brake operating pin 19 carried by the tractor. The movement of the pin 19 in a vertical direction by the brake operating mechanism on the tractor causes a raising and permits a lowering of the brake operating finger 18 which sets up the motion in the train of levers connected thereto which operates to apply the brakes on the trailer.

In order to provide for the release of the brakes on the trailer when the tractor and trailer are uncoupled I have provided a brake release lever 25, which is shown in detail in Fig. 4, the form of this brake release lever being well known to those skilled in the art. When in the position shown in Fig. 4, the brakes on the trailer are released so as to permit movement of the trailer when uncoupled from the tractor. It is to be observed, however, that this release of the trailer brakes does not affect the brake lock 40 and that the portion of the trailer brake operating mechanism which connects with the brake operating rod 24 is not affected by the release of the trailer brakes due to operation of the trailer brake release mechanism 25. This feature is particularly important in that when the brakes on the trailer are applied by movement of the brake release mechanism to the position shown in Fig. 1 for applying the brakes on the trailer, that the brakes on the trailer are automatically locked in an applied position by the lock 40.

From the foregoing it will be apparent that I have provided means for operating the brake on the semi-trailer which is confined in its movement to the width of the trailer frame and in which the brakes on the trailer are positively locked when the trailer is uncoupled from the tractor and in which the brakes on the trailer are automatically held in an applied position when the tractor and trailer vehicles are uncoupled.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States is:

1. In a semi-trailer having brakes, brake operating means, and means for coupling said trailer to a tractor; means adjacent said coupling means for operating said brake operating means, and locking means engaging said brake operating means including a cam and a lever for operating said cam connected thereto and rigidly extending from said coupling means whereby said means for operating said brake operating means is held in a brake applying position when the trailer is uncoupled from the tractor.

2. In a semi-trailer having brakes, brake operating means, and means for coupling said trailer to a tractor; means adjacent said coupling means for operating said brake operating means, and means including a pivoted cam and a lever operatively connected with said pivoted cam and extended rigidly from said coupling means whereby said means for operating said trailer brakes are held in a brake applying position when the trailer is uncoupled from the tractor.

3. In a semi-trailer having brakes, brake operating means, and means for coupling said trailer to a tractor; comprising a pair of pivoted coupler jaws, means for operating said brake operating means, and means rigidly extended from one of said coupler jaws for actuating said latter means whereby said brake operating means is held in a brake applying position when the trailer is uncoupled from the tractor.

4. In a semi-trailer having brakes, brake operating means, and means for coupling said trailer to a tractor; including, a pair of pivoted coupler jaws, means for operating said brake operating means including a pivoted locking cam and a lever connected to said pivoted locking cam and rigidly attached to one of said coupler jaws whereby said brake operating means is held in a brake applying position when the trailer is uncoupled from the tractor.

5. In a semi-trailer having brakes, brake operating means, and means for coupling said trailer to a tractor; means adjacent said coupling means for operating said brake operating means and including a pivoted shaft having a brake operating finger extending forwardly of said shaft and directly above said coupling means, and means rigidly attached to said coupling means and including an element limiting brake releasing movement of the brake operating finger whereby said brake operating means is held in a brake applying position when the trailer is uncoupled from the tractor.

6. In a trailer having brakes, brake operating means, and means for coupling said trailer to a tractor; means adjacent said coupling means for operating said brake operating means and including a pivoted shaft having a brake operating finger extending forwardly of said shaft and directly above said coupling means, and means operatively connected with said coupling means and including a lever rigidly extended from said coupling means and connected to a pivoted cam, said members and cam operative for preventing brake releasing rotation of said pivoted shaft whereby said brake operating means is held in a brake applying position when the trailer is uncoupled from the tractor.

7. In a trailer having brakes, brake operating means, and means for coupling said trailer to a tractor; means adjacent said coupling means for operating said brake operating means and including a pivoted shaft having a brake operating finger extending forwardly of said shaft and directly above said coupling means, and means operatively connected with said coupling means and including a pivoted cam and a lever operatively connected with said coupling means and to said pivoted cam, said latter means adapted to prevent brake releasing rotation of said pivoted shaft whereby said brake operating means is held in a brake applying position when the trailer is uncoupled from the tractor, and locking means extending through said coupling means and preventing accidental release of said brake operating means during the time the trailer and tractor are uncoupled.

8. In a semi-trailer having brakes, brake operating means, and means for coupling said trailer to a tractor; means adjacent said coupling means for operating said brake operating means and including a pivoted shaft having a brake operating finger extending forwardly of said shaft and directly above said coupling means, and means operatively connected with said coupling means whereby said brake operating means is held in a brake applying position when the trailer is uncoupled from the tractor, and locking means extending through said coupling means and preventing accidental release of said brake operating means during the time the trailer and tractor are uncoupled.

9. In a semi-trailer having brakes, brake operating means, and means for coupling said trailer to a tractor; including a pair of pivoted coupler jaws, means for operating said brake operating means including a lever connected to a pivoted locking cam and to one of said coupler jaws whereby said brake operating means is held in a brake applying position when the trailer is uncoupled from the tractor, and locking means extending through said coupling means and preventing accidental release of said brake operating means during the time the trailer and tractor are uncoupled.

SIDNEY B. WINN.